United States Patent
Hardee et al.

(10) Patent No.: US 10,664,151 B2
(45) Date of Patent: May 26, 2020

(54) ADAPTIVE ELECTRONIC EVENT REMINDER

(71) Applicant: INTERNATIONAL BUSINESS MACHINES CORPORATION, Armonk, NY (US)

(72) Inventors: Christopher J. Hardee, Raleigh, NC (US); Steve Joroff, Tokyo (JP); Pam Nesbitt, Raleigh, NC (US); Scott Schneider, Rolesville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 248 days.

(21) Appl. No.: 14/957,827

(22) Filed: Dec. 3, 2015

(65) Prior Publication Data
US 2017/0160802 A1    Jun. 8, 2017

(51) Int. Cl.
| | | |
|---|---|---|
| G06F 3/0488 | (2013.01) | |
| H04N 21/472 | (2011.01) | |
| G06F 3/01 | (2006.01) | |
| G06F 3/0481 | (2013.01) | |
| G06F 3/0484 | (2013.01) | |

(52) U.S. Cl.
CPC ............ *G06F 3/0488* (2013.01); *G06F 3/016* (2013.01); *G06F 3/0481* (2013.01); *G06F 3/04847* (2013.01); *H04N 21/47214* (2013.01); *G06F 2203/014* (2013.01)

(58) Field of Classification Search
None
See application file for complete search history.

(56) References Cited

U.S. PATENT DOCUMENTS 7,743,340 B2 *  6/2010  Horvitz ................ G05B 19/404
                                                 715/710
8,042,110 B1    10/2011  Kawahara et al.
(Continued)

FOREIGN PATENT DOCUMENTS

EP         2393047 A1 *  12/2011  ........... G06Q 10/109

OTHER PUBLICATIONS

Anonymous, "Subtle-Reminder," https://github.com/brynnb/Subtle-Reminder/blob/master/src/TrayIconDemo.java, GitHub, Inc., Jan. 5, 2013, pp. 1-3.
(Continued)

*Primary Examiner* — Christopher J Fibbi
(74) *Attorney, Agent, or Firm* — Cantor Colburn LLP; Samuel Waldbaum

(57) ABSTRACT

Embodiments include method, systems and computer program products for creating event reminders on a computational system. Aspects include a non-transitory storage medium readable by a processing circuit and storing instructions for execution by the processing circuit, the processing circuit configured to receive a user input, the user input comprising an event identifier. Aspects also include a user interface comprising a haptic sensor, a user input interface, and an output display. Aspects also include an electronic event reminder configured to display an event reminder that is generated by the processing circuit based at least in part upon the user input, wherein the event reminder comprises an aspect characteristic that changes over time.

12 Claims, 5 Drawing Sheets

(56) References Cited

U.S. PATENT DOCUMENTS

| | | | |
|---|---|---|---|
| 8,108,436 B2* | 1/2012 | Chhatrapati | G06F 17/30471 |
| | | | 705/7.18 |
| 8,238,876 B2 | 8/2012 | Teng et al. | |
| 8,548,431 B2 | 10/2013 | Teng et al. | |
| 8,805,450 B2 | 8/2014 | Wen et al. | |
| 2004/0128093 A1* | 7/2004 | Cragun | G06Q 10/109 |
| | | | 702/79 |
| 2007/0035513 A1 | 2/2007 | Sherrard et al. | |
| 2009/0307623 A1 | 12/2009 | Agarawala et al. | |
| 2010/0004033 A1* | 1/2010 | Choe | G06F 1/1626 |
| | | | 455/567 |
| 2010/0114974 A1* | 5/2010 | Jung | G06F 3/016 |
| | | | 707/802 |
| 2011/0004835 A1 | 1/2011 | Yanchar et al. | |
| 2014/0198628 A1* | 7/2014 | Yang | H04M 1/72566 |
| | | | 368/262 |
| 2014/0253522 A1 | 9/2014 | Cueto | |
| 2014/0274010 A1* | 9/2014 | Cavallaro | H04B 1/385 |
| | | | 455/418 |
| 2015/0149967 A1 | 5/2015 | Bernstein et al. | |
| 2016/0239354 A1* | 8/2016 | Shen | G06Q 10/109 |
| 2016/0259497 A1* | 9/2016 | Foss | G06F 3/0482 |
| 2017/0102172 A1* | 4/2017 | Fu | F25B 21/04 |

OTHER PUBLICATIONS

Brownlee, John, "Why We Need a Haptic Design Language for Wearables," Fast Company & Inc., http://www.fastcodesign.com/3043795/why-we-need-a-haptic-design-language-for-wearab . . . , Mar. 18, 2015, pp. 1-7.

Crider, Michael "Google Now's Call Reminder Feature is Pretty Clever," http://www.androidpolice.com/2014/06/08/google-nows-call-reminder-feature-can-find-so . . . , Jun. 8, 2014, pp. 1-3.

Döring, Tanja et al., "Ephemeral User Interfaces," ACM Interactions, http://interactions.acm.org/archive/view/july-august-2013/ephemeral-user-interfaces, Jul. and Aug. 2013, pp. 1-5.

Growl, "The Ultimate Notification System for OS X. Growl is the easiest way to know what's going on with your applications," Grown in Action, http://growl.info/screenshots, Oct. 7, 2015, pp. 1-2.

Pegoraro, Rob, "Yosemite tips: Turn off translucency, tune up notifications," USA TODAY, http://www.usatoday.com/story/tech/columnist/2014/11/02/mac-yosemite-tips/18207985/, Nov. 2, 2014, pp. 1-3.

* cited by examiner

ADAPTIVE ELECTRONIC EVENT REMINDER

BACKGROUND

The present invention relates to electronic event reminders, and more specifically, to electronic event reminders that are subtle, contextually aware or adaptive.

People increasingly look to technology to provide ways in which to remember upcoming events or deadlines. One existing way that technology can remind people of upcoming events can include applications which provide no output until it is time to be reminded of an upcoming event, at which point a reminder appears. Such a reminder can be pre-set to a default time for all events, or can be manually provided by a user when setting the reminder. In some cases, for example when there is a long period of time between setting the reminder and the occurrence of the reminder, the reminder may come as an undesirable surprise. In order to obtain notice with ample time for preparation, in some cases a reminder must be set well in advance and must be frequently updated as the event or deadline nears, requiring undesirably frequent interaction from a user.

Alternatively, to avoid setting frequent reminders or having a single reminder, some applications can provide a constantly prominent output providing a reminder of the event, which can sometimes be manually hidden from view or displayed. For example, a list of upcoming events can be provided on a task list with a number of additional items that can be opened or closed by an individual when convenient. For instance, a task list can contain a listing of all outstanding items and a user could open the task list every day or keep the task list displayed.

It would be desirable to obtain a subtle reminder of an upcoming event. Moreover, it would be desirable to provide a reminder of an upcoming event that is minimally intrusive. In addition, it would be desirable to have a reminder system that provides feedback to the user, along with the reminder, that allows a user to determine the level of urgency, imminence, or importance of an upcoming event or deadline other than the content of the reminder message.

SUMMARY

According to an embodiment of the present invention, a processing system for creating electronic event reminders includes a processor in communication with one or more types of memory. The system includes a user interface, which includes a haptic sensor, a user input interface and an output display. The system also includes an electronic event reminder configured to display an event reminder that is generated by the processing circuit based at least in part upon the user input, wherein the event reminder comprises an aspect characteristic that changes over time.

In accordance with another embodiment, a method for creating an event reminder is provided. The method includes receiving a user input including an event identifier. The method also includes receiving a haptic input including user touch information. The method further includes creating an electronic event reminder configured to display an event reminder that is generated by the processing circuit based upon the user input and the haptic input, wherein the event reminder includes an aspect characteristic that changes over time. The method also includes outputting the event reminder to a display.

In accordance with a further embodiment, a computer program product for creating an event reminder includes a non-transitory storage medium readable by a processing circuit and storing instructions for execution by the processing circuit for performing a method. The method includes receiving a user input including an event identifier. The method also includes receiving a haptic input including user touch information. The method further includes creating an electronic event reminder configured to display an event reminder that is generated by the processing circuit based upon the user input and the haptic input, wherein the event reminder includes an aspect characteristic that changes over time. The method also includes outputting the event reminder to a display.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

In accordance with exemplary embodiments of the disclosure, methods, systems and computer program products for creating an event reminder are provided.

Figure 1:
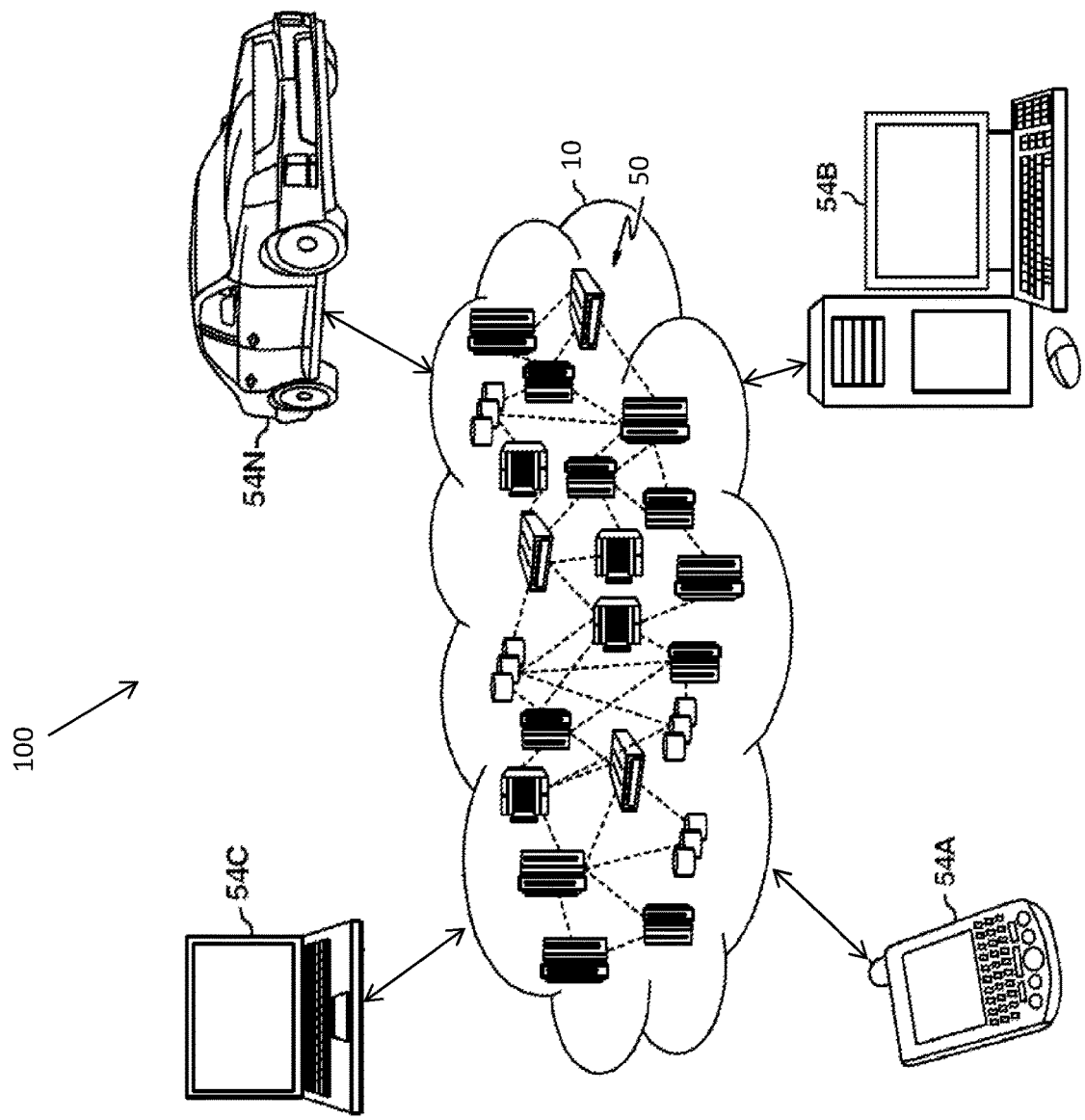
FIG. 1 illustrates a cloud computing environment capable of supporting core logic included in a mobile device data allocation system according to a non-limiting embodiment.

With reference now to FIG. 1, a cloud computing environment 10 capable of supporting the teachings herein is illustrated according to a non-limiting embodiment. As shown, cloud computing environment 10 comprises one or more cloud computing nodes 50 with which local computing devices used by cloud consumers, such as, for example, personal digital assistant (PDA) or cellular telephone 54A, desktop computer 54B, laptop computer 54C, and/or automobile computer system 54N may communicate. The nodes 50 may communicate with one another. They may be grouped (not shown) physically or virtually, in one or more networks, such as Private, Community, Public, or Hybrid clouds as described hereinabove, or a combination thereof. This allows cloud computing environment 10 to offer infrastructure, platforms and/or software as services for which a cloud consumer does not need to maintain resources on a local computing device. It is understood that the types of computing devices 54A-N shown in FIG. 2 are intended to be illustrative only and that computing nodes 50 and cloud computing environment 10 can communicate with any type of computerized device over any type of network and/or network addressable connection (e.g., using a web browser).

Figure 2:
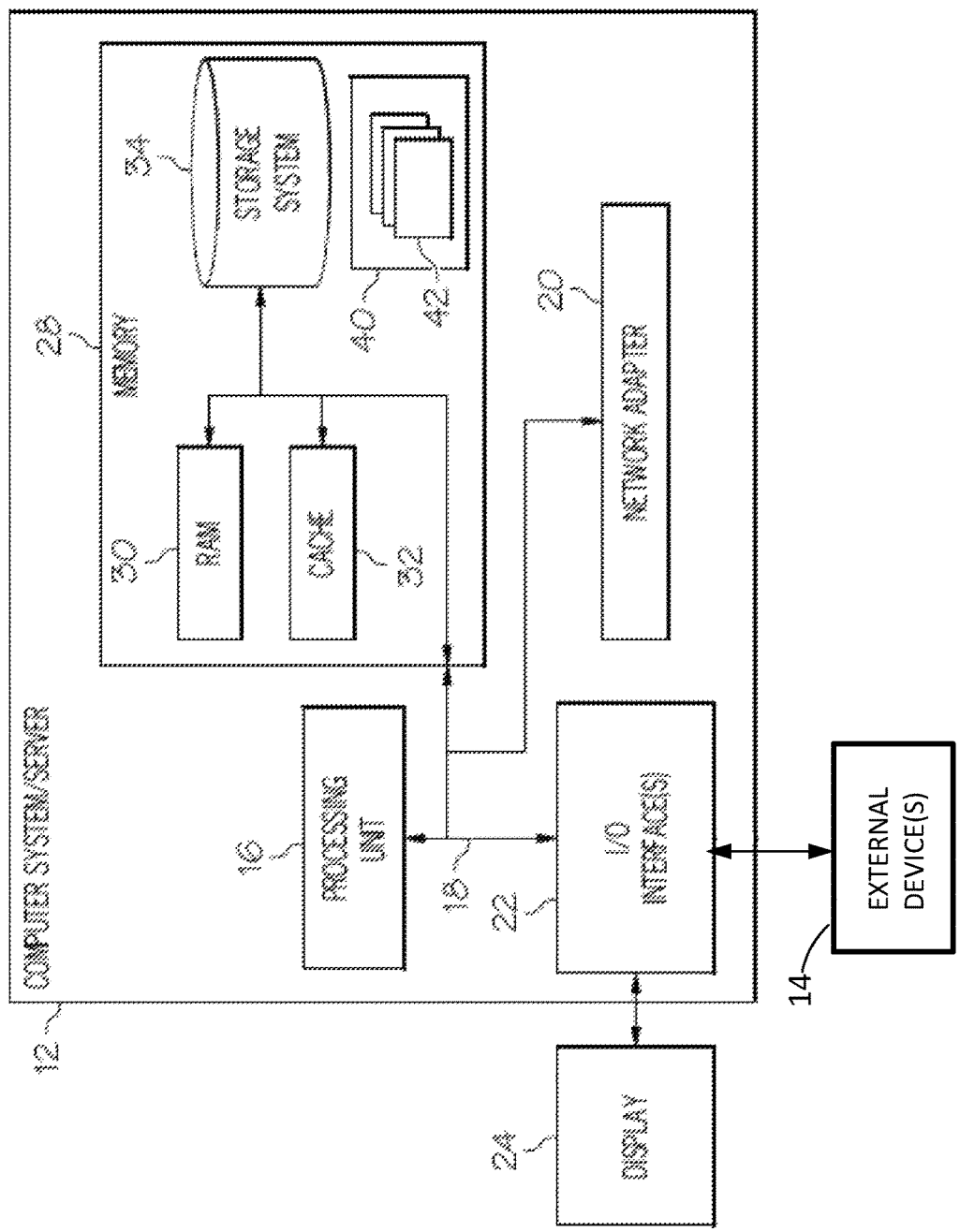
FIG. 2 is a schematic diagram of a cloud computing node included in a distributed cloud environment.

Referring now to FIG. 2, a schematic of a cloud computing node 50 included in a distributed cloud environment or cloud service network is shown according to a non-limiting embodiment. The cloud computing node 50 is only one example of a suitable cloud computing node and is not intended to suggest any limitation as to the scope of use or functionality of embodiments of the invention described herein. Regardless, cloud computing node 50 is capable of being implemented and/or performing any of the functionality set forth hereinabove.

In cloud computing node 50 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system/server 12 in cloud computing node 50 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 3:
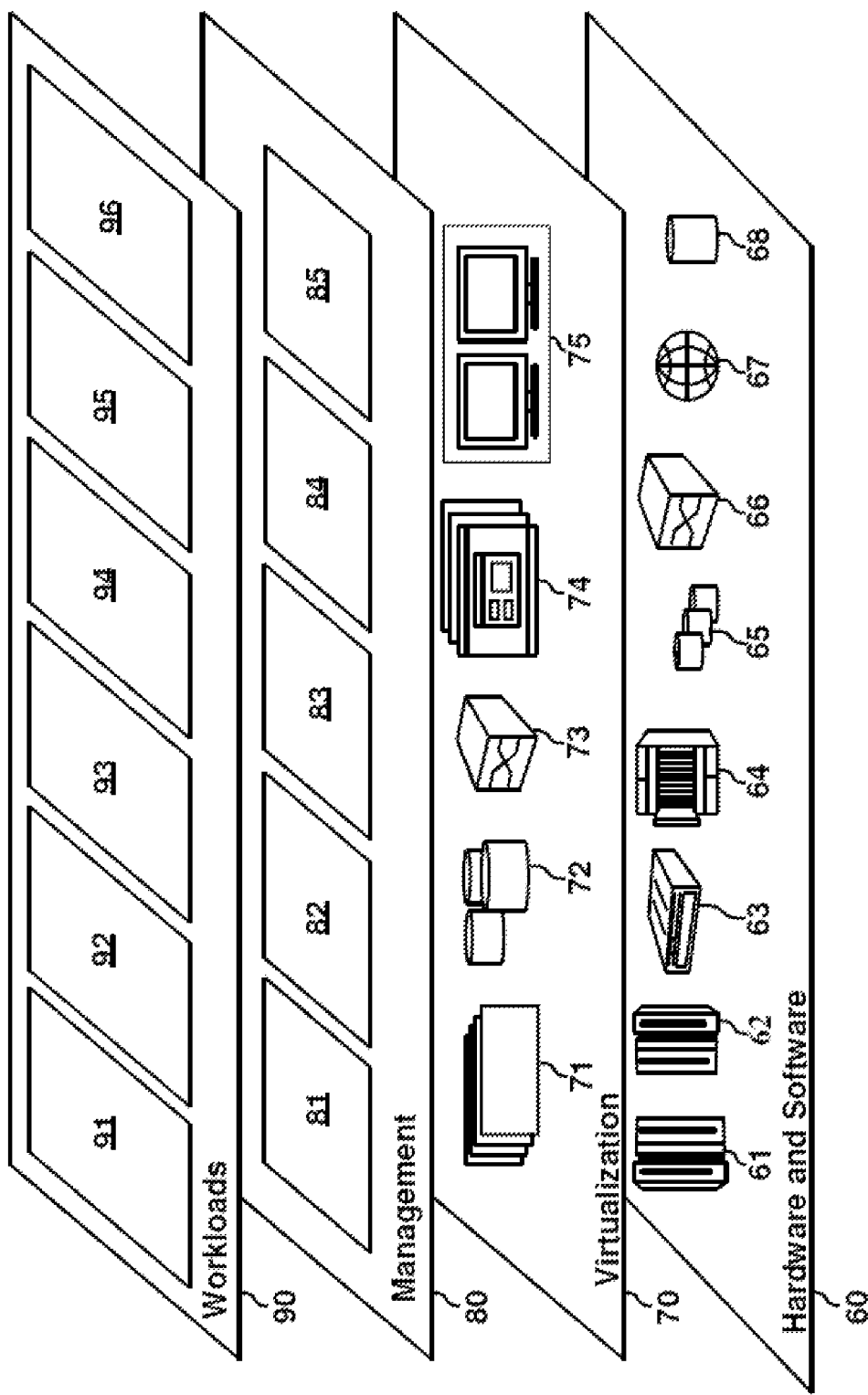
FIG. 3 is a set of functional abstraction layers provided by a cloud computing environment capable of supporting core logic included in a mobile device data allocation system according to a non-limiting embodiment.

Referring now to FIG. 3, a set of functional abstraction layers provided by cloud computing environment 10 is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provided pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

Although a cloud environment capable of supporting the core logic of the data service network system 102 is described in detail above, it should be appreciated that the core logic of the data service network system 102 can reside locally on one or more of the devices 54A-54N. For instance, each mobile device 54A may have installed locally thereon the core logic of the data service network system 102. In this manner, the mobile devices 54 can perform locally the various features and operations of the data service network system 102.

Figure 4:
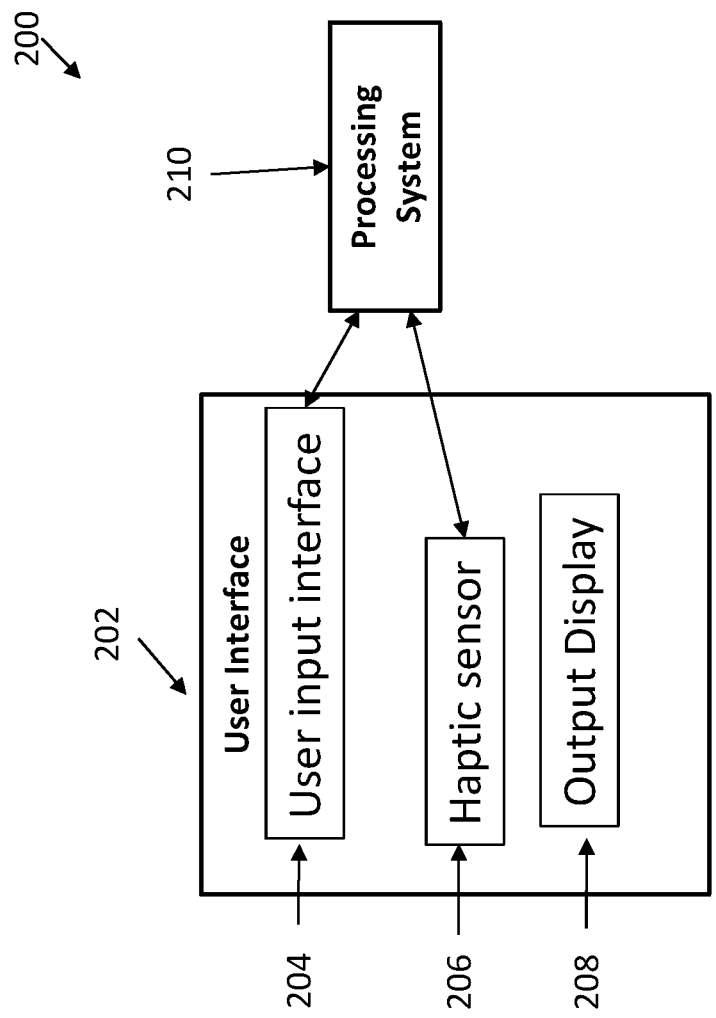
FIG. 4 is a schematic diagram illustrating a user interface of an electronic event reminder system in accordance with an exemplary embodiment.

Referring now to FIG. 4, a processing system for creating an event reminder in accordance with an exemplary embodiment is illustrated. As illustrated, the system 200 includes a user interface 202, which includes a user input 204, a haptic sensor 206, and an output display 208. The user input can be any input that receives data from a user to a processing system. In one embodiment, the user input 204 can be a computer keyboard or cellular phone type pad. In some embodiments, the user input 204 is a voice recorder. In one embodiment, the haptic sensor can be a touch sensitive button or a touch sensitive screen, for instance on a cellular phone or a tablet or a TV. The haptic sensor can be configured to receive any haptic input. In some embodiments, the haptic sensor receives a haptic input comprising user touch duration. In some embodiments, the haptic input comprises a relative user touch pressure. User interface 202 interacts with processing system 210 to generate an electronic event reminder. The electronic event reminder can be provided to the user on an output display 208 included in the user interface 202.

In some embodiments, system does not include a haptic sensor. In accordance with the disclosure a processing system for creating electronic event reminders includes a non-transitory storage medium readable by a processing circuit and storing instructions for execution by the processing circuit. The processing circuit can be configured to receive a user input including an event identifier, wherein the user interface includes a user input interface, and an output display, but does not include a haptic sensor. An electronic event reminder can be configured to display an event reminder that is generated by the processing circuit based at least in part upon the user input, wherein the event reminder comprises an aspect characteristic that changes over time.

In some embodiments, the electronic event reminder is configured to display an event reminder that is based at least in part upon data received at the user input interface 204. In some embodiments, the electronic event reminder is based upon the user input and user input received by the haptic sensor 206.

In some embodiments, the electronic reminder comprises an aspect characteristic that changes over time. The aspect characteristic that changes over time can change based upon user settings and preferences, such as event importance, the proximity of the current time to the event time.

The aspect characteristic that changes over time can be a visual aspect, an auditory aspect, or a tactile aspect of the electronic reminder. For example, the electronic reminder may become more prominent on the output display, for instance by becoming larger, more opaque, or by moving from the periphery toward the display center.

In one embodiment, the electronic event reminder includes a reminder image that changes a visual aspect based upon the nearness of an upcoming event. In some embodiments, the reminder image size, color, or location on the display changes in relation to the proximity of a current time to the event time. For example, a user interface can contain a background event image depicting the event reminder or a collection of event reminders, wherein the most imminent events are more prominent on the output display. For instance, when a computer monitor is switched on or a mobile device is unlocked, the output display can, in some embodiments, show a number of bubbles, each bubble representing an electronic reminder. The bubbles can change over time, such as by changing color or by having a darker outline or by becoming larger, when the event becomes more imminent. In a collection of bubbles, those with the brightest colors or darkest outlines or greatest size can represent the events that should command the most attention from the user. In some embodiments, a user can move the event images, for example by pushing the images away on a touch screen. In some embodiments, after a user pushes the images away, the images can reappear based on pre-defined settings. For example, a pre-defined setting can specify that event images reappear once per day until an event time is within a day of a current time and then once hourly thereafter.

In some embodiments the aspect characteristic that changes over time is an auditory aspect. For example, based upon event importance or imminence, an event reminder can generate a sound or not generate a sound. In some embodiments, a variety of different sounds can be used to designate event importance or imminence, such as different tones or different beats. For instance, a series of staccato beats can indicate that a report deadline is approaching, wherein the staccato beats can become more rapid as the event deadline approaches.

In some embodiments, the aspect characteristic that changes over time is a tactile aspect. For example, based upon vent importance or imminence, a surface might become warm in response to a user touch on the event image. In some embodiments, for example, the aspect characteristic is vibration. For instance, a vibration may be a gentle vibration or a vigorous vibration.

In some embodiments, an event reminder has an aspect characteristic that provides qualitative information concerning the event. For instance, an event image can include a gold bubble to represent an anniversary or an event reminder can include a vibration to represent an upcoming scheduled massage.

In some embodiments, a user inputs an event identifier at the user input interface. In some embodiments, a user inputs an event identifier, an event date and an event time at the user input interface.

In some embodiments, user input is received by the haptic sensor 206. In some embodiments, the haptic sensor is configured to receive a haptic input including a user touch duration or a relative pressure signal. In some embodiments, a user touch duration is used to assign an initial aspect characteristic. For example, a user may set two events, where after inputting first event information at a user input interface, the user presses a button including a haptic sensor for one second and after inputting second event information at a user input interface, the user presses the button including the haptic sensor for ten seconds. A processing system can use the duration of the user touch to assign an initial aspect characteristic, such as a relative size. For instance, an electronic reminder image generated in response to a one second touch can be smaller than an electronic reminder image generated in response to a ten second touch, thereby providing the user with a visual representation of event importance. In some embodiments, a relative pressure signal is used to assign an initial aspect characteristic. For example, a user can enter event information at a user input interface and press in the event providing further information at a haptic sensor. In some embodiments, for example, pressing relatively hard at the haptic sensor can cause a processor to generate an electronic event reminder with a relatively high level of importance. Such a high level of importance can be used to assign an initial aspect characteristic, such as by setting a rate of change for an aspect characteristic.

In some embodiments, an electronic reminder image can be moved, for example by touch through a touch screen or with a mouse. For instance, a user can swipe an electronic reminder image to the side of an output display or off the screen. In some embodiments, electronic reminder images that have been dismissed from view reappear automatically. The time at which the images can reappear may be pre-set, may be determined at the time of creating the electronic event reminder, or may be determined after the time of creating the electronic event reminder. For instance, in some embodiments, a user can set a time for an electronic event reminder to reappear by inputting a time into the user interface or by pressing on the electronic event reminder, for example for a certain period of time or with a certain pressure. In some embodiments, a higher level of importance could be used to set the frequency that dismissed event images reappear.

In some embodiments, the electronic reminder provides a haptic feedback to a user. In some embodiments, the electronic reminder image provides a haptic feedback to a user when touched. Haptic feedback can include, but is not limited to, a feel that can be generated based on information stored in the computing device, such as heat, vibration, including mild vibration and vigorous vibration, auditory signals, including sounds of varying volume, type, beat, or combinations thereof, or device temperature, for example wherein a device can increase temperature and become warm to the touch.

Figure 5:
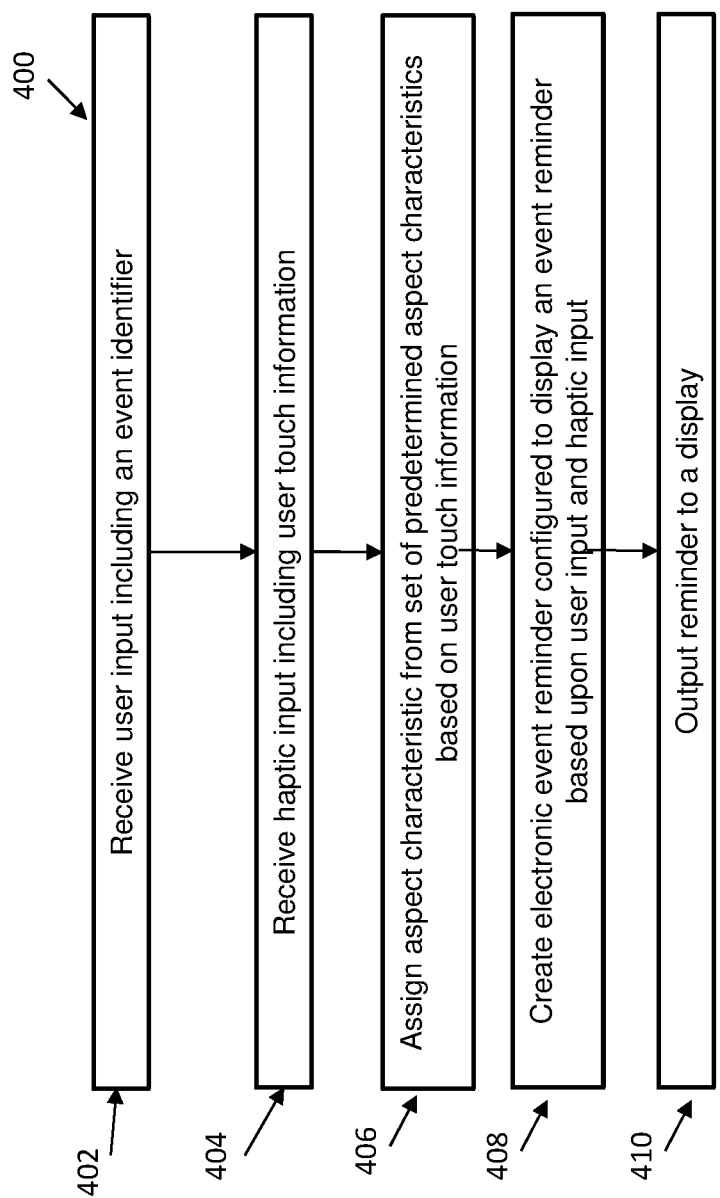
FIG. 5 is a flow diagram of a method for creating an event reminder in accordance with an exemplary embodiment.

Referring now to FIG. 5, a flow diagram of a method 400 for creating an event reminder in accordance with an exemplary embodiment is shown. As shown at block 402, the method 400 includes receiving a user input including an event identifier. Next as shown at block 404, the method includes receiving a haptic input including user touch information. In some embodiments, the method 400 also includes, as shown at block 406, assigning an aspect characteristic to the event identifier from a set of predetermined aspect characteristics based upon the user touch information. Next, as shown at block 408, the method 400 includes creating an electronic event reminder based upon the user input and the haptic input. The method 400 includes, as shown at block 410, outputting a reminder to a display.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A processing system for creating electronic event reminders, comprising:
   a non-transitory storage medium readable by a processing circuit and storing instructions for execution by the processing circuit, the processing circuit configured to receive a user input, the user input comprising an event identifier;
   a user interface comprising:
      a haptic sensor, wherein the haptic sensor is configured to receive a haptic input comprising a relative pressure signal and wherein the relative pressure signal is used to assign an initial aspect characteristic;
      a user input interface, and
      an output display;
   an electronic event reminder configured to output an event reminder that is generated by the processing circuit based at least in part upon the user input;
   wherein the event reminder comprises the aspect characteristic that changes over time, wherein the aspect characteristic that changes over time comprises an increase in temperature of the user interface, and wherein a relative rate of change is assigned to the aspect characteristic based at least in part on the relative pressure signal;
   a second event reminder configured to output a second event reminder that is generated by the processing circuit based at least in part on a second user input, wherein the second user input comprises user touch information, wherein the user touch information comprises a pressure signal having an intensity;
   wherein the second event reminder comprises a level of importance;
   wherein the level of importance is based on the intensity of the pressure signal;
   wherein the second event reminder is displayed after an elapsed length of time after receiving the second user input; and
   wherein the elapsed length of time is determined based on the level of importance set by the intensity of the pressure signal.

2. The reminder system of claim 1, wherein the user input further comprises an event date and an event time.

3. The reminder system of claim 1, wherein the event reminder comprises a reminder image.

4. The reminder system of claim 3, wherein the reminder image size, color, or location on the display changes in relation to the proximity of a current time to the event time.

5. The reminder system of claim 3, wherein the reminder image is configured to be moved by touch.

6. The reminder system of claim 3, wherein the reminder image provides a haptic feedback to a user when touched.

7. The reminder system of claim 6, wherein the haptic feedback comprises a visual output, a sensory output, or an auditory output.

8. The reminder system of claim 7, wherein the haptic feedback comprises a vibration.

9. The reminder system of claim 3, wherein the reminder image is configured to be temporarily hidden from view.

10. The reminder system of claim 1, wherein the haptic sensor is configured to receive a haptic input comprising a user touch duration and wherein the user touch duration is used to assign an initial aspect characteristic.

11. A method for creating an event reminder comprising:
    receiving, to a processor, a user input comprising an event identifier;
    receiving, to a haptic sensor, a haptic input comprising user touch information, wherein the haptic sensor is configured to receive a haptic input comprising a relative pressure signal and wherein the relative pressure signal is used to assign an aspect characteristic;

creating, by the processor, an electronic event reminder configured to output an event reminder that is generated by the processing circuit based upon the user input and the haptic input, wherein the event reminder comprises the aspect characteristic that changes over time, wherein the aspect characteristic that changes over time comprises an increase in temperature of a display device, and wherein a relative rate of change is assigned to the aspect characteristic based at least in part on the relative pressure signal;

outputting the event reminder to the display device;

receiving a second haptic input comprising second user touch information;

creating a second event reminder configured to output a second event reminder responsive to receiving the second user touch information, wherein the second user touch information comprises a pressure signal having an intensity;

wherein the second event reminder comprises a level of importance;

wherein the level of importance is based on the intensity of the pressure signal; and outputting the second event reminder to the display device after an elapsed length of time after receiving the second user touch information, wherein the elapsed length of time is determined based on the level of important set by the intensity of the pressure signal.

12. A computer program product for creating an event reminder on a computational system, the computer program product comprising:

a non-transitory storage medium readable by a processing circuit and storing instructions for execution by the processing circuit for performing a method comprising:

receiving, to the processor, a user input comprising an event identifier;

receiving, to a haptic sensor, a haptic input comprising user touch information, wherein the haptic sensor is configured to receive a haptic input comprising a relative pressure signal and wherein the relative pressure signal is used to assign an initial aspect characteristic;

creating, by the processor, an electronic event reminder configured to output an event reminder that is generated by the processing circuit based upon the user input and the haptic input, wherein the event reminder comprises the aspect characteristic that changes over time, wherein the aspect characteristic that changes over time comprises an increase in temperature of a display device, and wherein a relative rate of change is assigned to the aspect characteristic based at least in part on the relative pressure signal;

outputting the event reminder to the display device;

receiving a second haptic input comprising second user touch information;

creating a second event reminder configured to output a second event reminder responsive to receiving the second user touch information, wherein the second user touch information comprises a pressure signal having an intensity;

wherein the second event reminder comprises a level of importance;

wherein the level of importance is based on the intensity of the pressure signal; and outputting the second event reminder to the display device after an elapsed length of time after receiving the second user touch information, wherein the elapsed length of time is determined based on the level of important set by the intensity of the pressure signal.

* * * * *